(12) United States Patent
Klüver

(10) Patent No.: US 8,174,926 B2
(45) Date of Patent: May 8, 2012

(54) METHOD FOR WAVEFIELD SEPARATION FOR DUAL-SENSOR DATA USING KIRCHHOFF-TYPE DATUMING AND MIGRATION

(75) Inventor: Tilman Klüver, Oslo (NO)

(73) Assignee: PGS Geophysical AS, Lysaker (NO)

( * ) Notice: Subject to any disclaimer, the term of this patent is extended or adjusted under 35 U.S.C. 154(b) by 651 days.

(21) Appl. No.: 12/321,175

(22) Filed: Jan. 20, 2009

(65) Prior Publication Data

US 2010/0182873 A1 Jul. 22, 2010

(51) Int. Cl.
*G01V 1/00* (2006.01)
(52) U.S. Cl. .................. 367/21; 367/23; 367/24; 367/72
(58) Field of Classification Search .................... 367/21, 367/23, 24, 72
See application file for complete search history.

(56) References Cited

U.S. PATENT DOCUMENTS

| | | | |
|---|---|---|---|
| 7,336,561 B2 | 2/2008 | Borresen | |
| 7,359,283 B2 | 4/2008 | Vaage et al. | |
| 7,835,225 B2 * | 11/2010 | Sollner et al. | 367/24 |
| 2010/0286920 A1 * | 11/2010 | Day et al. | 702/17 |

OTHER PUBLICATIONS

Norman Bleistein, (1987), "On the imaging of reflectors in the earth", Geophysics, vol. 52, No. 7, pp. 931-942.
J. Schleicher, M. Tygel, P. Hubral, (2007), "Seismic True-Amplitude Imaging", SEG Geophysical Developments Series No. 12, SEG publications, Chapter 7 (pp. 190-217), Chapter 8 (pp. 245-257).
M. Tygel, J. Schleicher, C. Hanitzsch (1993), "Multiple weights in diffraction stack migration", Geophysics, vol. 59, No. 12, pp. 1820-1830.
Harrie Swartjes, PCT International Search Report & Written Opinion, date search completed, Apr. 8, 2011.
Tilman Kluver, "Wavefield separation for dual-sensor data with local handling of aliased energy", (2008), SEG Las Vegas Annual Meeting, p. 1083-1087.
C.P.A. Wapenaar, "Kirchhoff-Helmholtz downward extrapolation in a layered medium with curved interfaces", (1993), Geophysical Journal Intn'l UK, vol. 115, No. 2, p. 445-446.
L. Amundsen, et al. "Rough-sea deghosting of streamer seismic data using pressure gradient approximations", (2005), Geophysics, vol. 70, No. 1, p. V1-V9.

\* cited by examiner

*Primary Examiner* — Mark Hellner

(57) ABSTRACT

A first weighted integral operator is applied to dual-sensor data to extrapolate the dual-sensor data to a first position above an acquisition surface, generating extrapolated data. A second weighted integral operator is applied to the extrapolated data to extrapolate the extrapolated data to a second position, generating wavefield separated data. One of the integral operators is applied to a scaled combination of the dual sensor data.

17 Claims, 5 Drawing Sheets

Apply first weighted integral operator to dual-sensor data to extrapolate dual-sensor data to first position above acquisition surface, generating extrapolated data — 30

Apply second weighted integral operator to extrapolated data to extrapolate extrapolated data to second position, generating wavefield separated data — 31

METHOD FOR WAVEFIELD SEPARATION FOR DUAL-SENSOR DATA USING KIRCHHOFF-TYPE DATUMING AND MIGRATION

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of wavefield separation in dual-sensor data.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes and recorded.

The resulting seismic data obtained in performing a seismic survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source. In an air gun array, each air gun typically stores and quickly releases a different volume of highly compressed air, forming a short-duration impulse.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of spatial arrays.

A particle motion sensor, such as a geophone, has directional sensitivity, whereas a pressure sensor, such as a hydrophone, does not. Accordingly, the upgoing wavefield signals detected by a geophone and hydrophone located close together will be in phase, while the downgoing wavefield signals will be recorded 180 degrees out of phase. Various techniques have been proposed for using this phase difference to reduce the spectral notches caused by the surface reflection and, if the recordings are made on the seafloor, to attenuate water borne multiples. It should be noted that an alternative to having the geophone and hydrophone co-located, is to have sufficient spatial density of sensors so that the respective wavefields recorded by the hydrophone and geophone can be interpolated or extrapolated to produce the two wavefields at the same location.

Conventional 3D marine seismic acquisition by towed streamer usually results in asymmetrical spatial sampling and fold between inline and cross-line directions. The sampling density is denser in the inline direction (parallel to the towed streamers) than in the cross-line direction (perpendicular to the towed streamers). The asymmetry is due to a wider spacing between receivers in separate streamers than between receivers in the same streamer. This asymmetry can lead to spatial aliasing of the sampling data in the cross-line direction. When the receivers are deployed on the sea-bottom, the lateral distance between adjacent receivers is often larger than the typical receiver separation in a streamer. This means that spatial aliasing can be a problem for data acquired with this type of receiver configuration as well. This invention considers data acquired with hydrophones and geophones. The geophone can record one or more components of the particle velocity vector. Common are three-component geophones which record the complete particle motion vector. Recording only the vertical component of the particle velocity is also common. Hydrophone and geophone records together are referred to as dual-sensor data in this invention.

Thus, a need exists for a method for wavefield separation for dual-sensor data that more efficiently corrects for spatial aliasing. Preferably, the method accomplishes this in the time-space domain where irregular receiver separations can be taken into account and does not require seismic trace interpolation.

BRIEF SUMMARY OF THE INVENTION

The invention is a method for wavefield separation for dual-sensor data. A first weighted integral operator is applied to dual-sensor data to extrapolate the dual-sensor data to a first position above an acquisition surface, generating extrapolated data. A second weighted integral operator is applied to the extrapolated data to extrapolate the extrapolated data to a second position, generating wavefield separated data. One of the integral operators is applied to a scaled combination of the dual sensor data.

BRIEF DESCRIPTION OF THE DRAWINGS

The invention and its advantages may be more easily understood by reference to the following detailed description and the attached drawings, in which.

Figure 1:
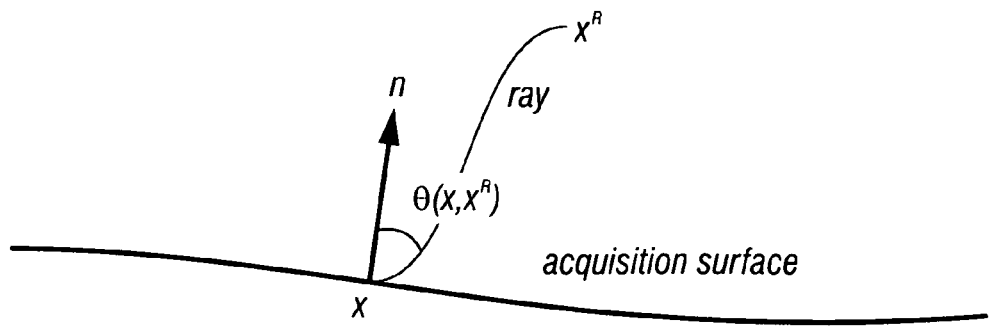
FIG. 1 is a schematic side view of a ray from the acquisition surface.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for wavefield separation for dual-sensor data. In the following, three embodiments of the method of the invention for separating recorded wavefields into their up-going and down-going parts are described. Wavefields are recorded with receivers disposed in a plurality of seismic streamers, also known as a 3D spread, or deployed on the sea-bottom. The receivers define the acquisition surface, which is a horizontal plane in the ideal case of flat horizontal streamers or a flat horizontal sea-bottom. However, the acquisition surface need not be flat, as this is not a limitation of the invention. At each receiver location on the acquisition surface, two wavefields are recorded or built by means known in the art from more recorded wavefields. The two wavefields are the pressure field consisting of up-going and down-going parts (hydrophone record) and the component of the particle velocity field normal to the acquisition surface (geosensor record), again consisting of up-going and down-going parts. The method of the invention employs a scaled combination of the two recorded wavefields in the integral expressions that separate the wavefields.

Conventional methods consider only homogeneous media. In the method of the invention, the earth model can be laterally heterogeneous. However, the earth model can also be replaced by a smooth background model which correctly represents the kinematics of wave propagation and is in accordance to the high-frequency approximation. This approximation means that wave propagation can be described with high accuracy by zero order ray theory. All three embodiments exploit the principle of stationary phase which automatically selects the correct obliquity factor to be applied in the wavefield separation.

The down-going parts of the wavefield are due to the reflection of all up-going events at the sea-surface. In the following, a hypothetical model where the sea-surface is absent will be considered. The down-going energy will be treated implicitly as up-going energy. This corresponds to a virtual reflection of the down-going energy at the acquisition surface without any amplitude changes, i.e. without changes to magnitude and polarization. The only thing which happens mathematically is a change of sign of the vertical component of the slowness vector associated with a down-going wavefront. The space above the sea-surface, filled with air in reality, is assumed to be filled with water such that a smooth transition of all medium properties at the sea-surface is assured.

The first embodiment of the method of the invention is wavefield separation using Kirchhoff-type time domain or frequency domain datuming. This first embodiment extrapolates a combination of common-shot records of the recorded wavefields to a level above the acquisition surface. The combination of the recorded wavefields is such that they separate into up-going and down-going parts in this datuming step. The separated wavefields are then back-propagated to the original level, generally to any level. The output of this first embodiment is common-shot ensembles of seismic traces, i.e. seismic pre-stack data of separated wavefields.

A pressure field $p(x, \omega)$ recorded at a point x on an acquisition surface S can be forward extrapolated in time to another point $x^R$ above the acquisition surface using the following integral equation:

$$p(x^R, \omega) \cong \frac{i\omega}{2\pi} \int_S W(x, x^R) p(x, \omega) \exp[-i\omega\tau(x, x^R)] dS, \quad (1)$$

where i is the imaginary unit and $\omega$ denotes angular frequency. The traveltime along the ray connecting x and $x^R$ is given by $\tau(x, x^R)$. The term $W(x, x^R)$ in Equation (1) is a weighting factor, which is given by $$W(x, x^R) = \frac{1}{\rho(x)} G_0(x, x^R) \frac{\cos[\theta(x, x^R)]}{c(x)}, \quad (2)$$

where $\rho(x)$ is the density and $c(x)$ is the speed of sound in the medium. The factor $G_0(x, x^R)$ in Equation (2) takes into account amplitude changes due to geometrical spreading. FIG. 1 is a schematic side view of a ray from the acquisition surface. $\theta(x, x^R)$ denotes the angle measured at x between the ray connecting points x and $x^R$ and the unit normal vector to the acquisition surface, n(x), which points towards $x^R$. The equation of motion relates the pressure field with the three-component particle velocity field. The component of the particle velocity field normal to the acquisition surface $v_n(x, \omega)$ is derived from a three-component particle velocity field measurement by means well known in the art. The relationship between pressure and particle velocity fields allows using an integral equation analogous to Equation (1) for datuming the normal component of the particle velocity:

$$v_n(x^R, \omega) \cong \frac{i\omega}{2\pi} \int_S W(x, x^R) v_n(x, \omega) \exp[-i\omega\tau(x, x^R)] dS. \quad (3)$$

Figure 2:
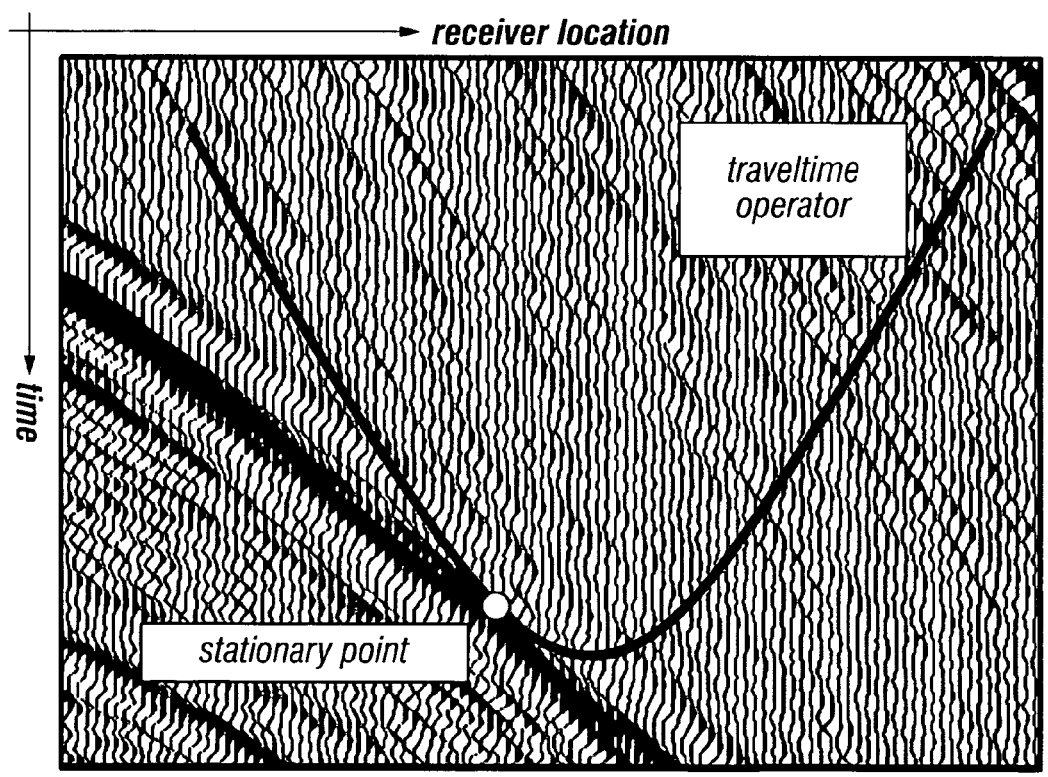
FIG. 2 is a section showing a traveltime operator on top of a part of a common-shot pressure record.

In a homogeneous medium with constant media properties $\rho$ and c, an event in the pressure record or in the normal component of the particle velocity record can be separated into its up-going and down-going components using the following equations:

$$p^{up}(x, \omega) = \frac{1}{2}\left(p(x, \omega) - \frac{\rho c}{\cos[\theta(x)]} v_n(x, \omega)\right), \quad (4)$$

$$p^{dn}(x, \omega) = \frac{1}{2}\left(p(x, \omega) + \frac{\rho c}{\cos[\theta(x)]} v_n(x, \omega)\right), \quad (5)$$

$$v_n^{up}(x, \omega) = \frac{1}{2}\left(v_n(x, \omega) - \frac{\cos[\theta(x)]}{\rho c} p(x, \omega)\right), \text{ and} \quad (6)$$

$$v_n^{dn}(x, \omega) = \frac{1}{2}\left(v_n(x, \omega) + \frac{\cos[\theta(x)]}{\rho c} p(x, \omega)\right), \quad (7)$$

respectively, as is well known in the art. Here, $\cos[\theta(x)]$ denotes the angle between the propagation direction of the wavefront associated with that event and the unit normal vector n, and $v_n(x, \omega)$ is the recorded component of the particle velocity field normal to the acquisition surface S. Equations (4) through (7) remain valid in slightly inhomogeneous media within the validity range of the high-frequency approximation, in which a propagating wave behaves locally like a plane wave, and, thus, the wavefield can be separated using the local medium properties $\rho(x)$ and $c(x)$. The angle $\theta(x)$ is initially unknown, but will be automatically determined by application of the integral equation of Equations (1) or (3), as the major contribution comes from a small zone (Fresnel zone) around the stationary point. At the stationary point, the traveltime surface defined by $\tau(x, x^R)$ and the seismic event are tangent, i.e. both have the same dip, as is shown in FIG. 2. Consequently, when the correct local velocity is used, $$\cos[\theta(x, x^R)] = \cos[\theta(x)]. \quad (8)$$

The sum (integral) over contributions from outside a small range around the stationary point is negligibly small. This localness of the contributions remains valid when the wavefield is scaled by a smoothly varying function. Thus, only the contributions close to the stationary point and scaled by obliquity factors close to the correct obliquity factor affect the results of the corresponding integral expressions. Thus, in a first embodiment of the method of the invention, the extrapolation of the up-going and down-going pressure fields and normal components of particle velocity fields at point $x^R$ are estimated separately by combining Equations (4) through (7) with Equation (1), yielding the following integral equations:

$$p^{up}(x^R, \omega) \cong \frac{i\omega}{2\pi} \int_S W(x, x^R) \quad (9)$$
$$\frac{1}{2}\left(p(x, \omega) - \frac{\rho(x)c(x)}{\cos[\theta(x, x^R)]} v_n(x, \omega)\right) \exp[-i\omega\tau(x, x^R)] dS,$$

$$p^{dn}(x^R, \omega) \cong \frac{i\omega}{2\pi} \int_S W(x, x^R) \quad (10)$$
$$\frac{1}{2}\left(p(x, \omega) + \frac{\rho(x)c(x)}{\cos[\theta(x, x^R)]} v_n(x, \omega)\right) \exp[-i\omega\tau(x, x^R)] dS,$$

$$v_n^{up}(x^R, \omega) \cong \frac{i\omega}{2\pi} \int_S W(x, x^R) \quad (11)$$
$$\frac{1}{2}\left(v_n(x, \omega) - \frac{\cos[\theta(x, x^R)]}{\rho(x)c(x)} p(x, \omega)\right) \exp(-i\omega\tau(x, x^R)) dS, \text{ and}$$

$$v_n^{dn}(x^R, \omega) \cong \frac{i\omega}{2\pi} \int_S W(x, x^R) \quad (12)$$
$$\frac{1}{2}\left(v_n(x, \omega) + \frac{\cos[\theta(x, x^R)]}{\rho(x)c(x)} p(x, \omega)\right) \exp(-i\omega\tau(x, x^R)) dS.$$

Using the well-known relationships between the frequency domain and the time domain $$i\omega p(x, \omega) \leftrightarrow \frac{\partial}{\partial t} p(x, t) \text{ and} \quad (13)$$

$$p(x, \omega) \exp(-i\omega\tau(x, x^R)) \leftrightarrow p(x, t - \tau(x, x^R)), \quad (14)$$

the time-domain extrapolation expressions corresponding to Equations (9) through (12) are obtained as:

$$p^{up}(x^R, t) \cong \frac{1}{2\pi} \int_S W(x, x^R) \frac{1}{2} \frac{\partial}{\partial t} \quad (15)$$
$$\left(p(x, t - \tau(x, x^R)) - \frac{\rho(x)c(x)}{\cos[\theta(x, x^R)]} v_n(x, t - \tau(x, x^R))\right) dS,$$

$$p^{dn}(x^R, t) \cong \frac{1}{2\pi} \int_S W(x, x^R) \frac{1}{2} \frac{\partial}{\partial t} \quad (16)$$
$$\left(p(x, t - \tau(x, x^R)) + \frac{\rho(x)c(x)}{\cos[\theta(x, x^R)]} v_n(x, t - \tau(x, x^R))\right) dS,$$

$$v_n^{up}(x^R, t) \cong \frac{1}{2\pi} \int_S W(x, x^R) \frac{1}{2} \frac{\partial}{\partial t} \quad (17)$$
$$\left(v_n(x, t - \tau(x, x^R)) - \frac{\cos[\theta(x, x^R)]}{\rho(x)c(x)} p(x, t - \tau(x, x^R))\right) dS, \text{ and}$$

$$v_n^{dn}(x^R, t) \cong \frac{1}{2\pi} \int_S W(x, x^R) \frac{1}{2} \frac{\partial}{\partial t} \quad (18)$$
$$\left(v_n(x, t - \tau(x, x^R)) + \frac{\cos[\theta(x, x^R)]}{\rho(x)c(x)} p(x, t - \tau(x, x^R))\right) dS,$$

respectively. Either the time-domain extrapolation expressions in Equations (15) through (18) or the frequency-domain extrapolation expressions in Equations (9) through (12) can be used for performing this first datuming step in this first embodiment of the invention.

The maximum time dip in the output is determined by the chosen operator taper in the first datuming step, i.e. by the maximum angle $\theta(x, x^R)$ considered along the traveltime operator. The datuming distance then controls the number of traces in the aperture and the dip sampling as the angle $\theta(x, x^R)$ generally decreases with increasing datuming distance.

FIG. 2 shows a traveltime operator on top of a part of a pressure record. At the stationary point, the traveltime operator is tangential to the seismic event. Both have the same dip. To provide the up-going and down-going fields at the original acquisition surface or a level near by (e.g. for comparison with a different survey), a second datuming step is required, usually a backward propagation in time. The operation performing back-propagation is expressed by the adjoint form of the above given integral Equations (9)-(12) in the frequency domain or (15)-(18) in the time domain, which is obtained by swapping the sign of $i\omega$ or the time delay function $\tau(x, x^R)$, respectively. Thus, in the first embodiment of the method of the invention, the up-going and down-going pressure fields at a point $\tilde{x}$ below $x^R$ are given by $$p^{up}(\tilde{x}, \omega) \cong -\frac{i\omega}{2\pi} \int_S W(x^R, \tilde{x}) p^{up}(x^R, \omega) \exp(i\omega\tau(\tilde{x}, x^R)) dS \quad (19)$$

and $$p^{dn}(\tilde{x}, \omega) \cong -\frac{i\omega}{2\pi} \int_S W(x^R, \tilde{x}) p^{dn}(x^R, \omega) \exp(i\omega\tau(\tilde{x}, x^R)) dS \quad (20)$$

in the frequency domain and by $$p^{up}(\tilde{x}, t) \cong -\frac{1}{2\pi} \int_S W(x^R, \tilde{x}) \frac{\partial}{\partial t} p^{up}(x^R, t + \tau(\tilde{x}, x^R)) dS \quad (21)$$

and $$p^{dn}(\tilde{x}, t) \cong -\frac{1}{2\pi} \int_S W(x^R, \tilde{x}) \frac{\partial}{\partial t} p^{dn}(x^R, t + \tau(\tilde{x}, x^R)) dS \quad (22)$$

in the time domain. The corresponding equations for up-going and down-going normal components of the particle velocity field read:

$$v_n^{up}(\tilde{x}, \omega) \cong -\frac{i\omega}{2\pi} \int_S W(x^R, \tilde{x}) v_n^{up}(x^R, \omega) \exp(i\omega\tau(\tilde{x}, x^R)) dS \quad (23)$$

and $$v_n^{dn}(\tilde{x}, \omega) \cong -\frac{i\omega}{2\pi} \int_S W(x^R, \tilde{x}) v_n^{dn}(x^R, \omega) \exp(i\omega\tau(\tilde{x}, x^R)) dS \quad (24)$$

in the frequency domain and $$v_n^{up}(\tilde{x}, t) \cong -\frac{1}{2\pi} \int_S W(x^R, \tilde{x}) \frac{\partial}{\partial t} v_n^{up}(x^R, t + \tau(\tilde{x}, x^R)) dS \quad (25)$$

and $$v_n^{dn}(\tilde{x}, t) \cong -\frac{1}{2\pi} \int_S W(x^R, \tilde{x}) \frac{\partial}{\partial t} v_n^{dn}(x^R, t + \tau(\tilde{x}, x^R)) dS \quad (26)$$

in the time domain. For $\tilde{x}=x$ in Equations (19) through (26), the output is given at the original acquisition surface S. Again, either the time-domain extrapolation expressions in Equations (21)-(22) and (25)-(26) or the frequency-domain extrapolation expressions in Equations (19)-(20) and (23)-(24) can be used for performing this second datuming step in this first embodiment of the invention.

Figure 3:
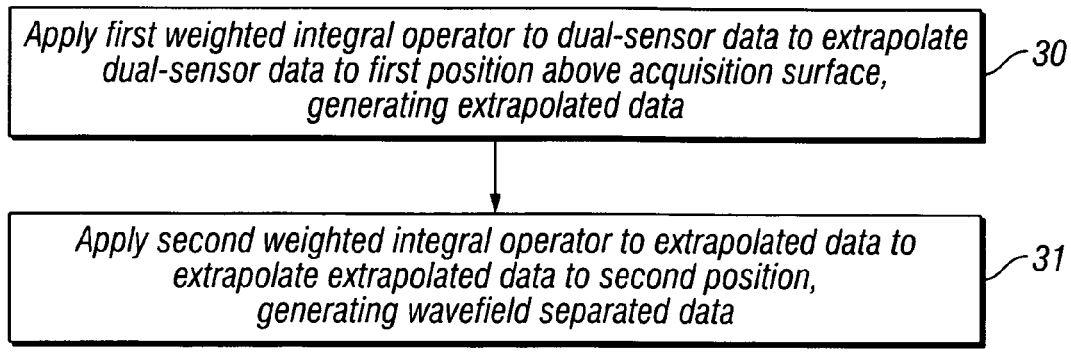
FIG. 3 is a flowchart illustrating general embodiment of the invention for wavefield separation for dual-sensor data.
Figure 7:
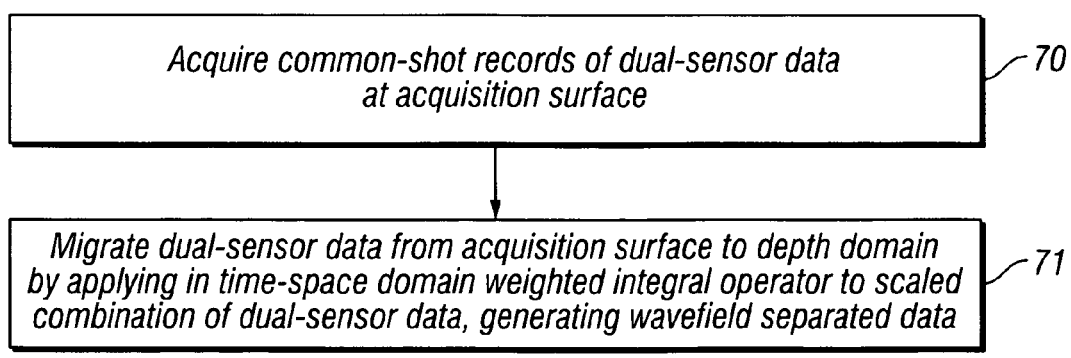
FIG. 7 is a flowchart illustrating a third embodiment of the invention for wavefield separation for dual-sensor data.
Figure 4:
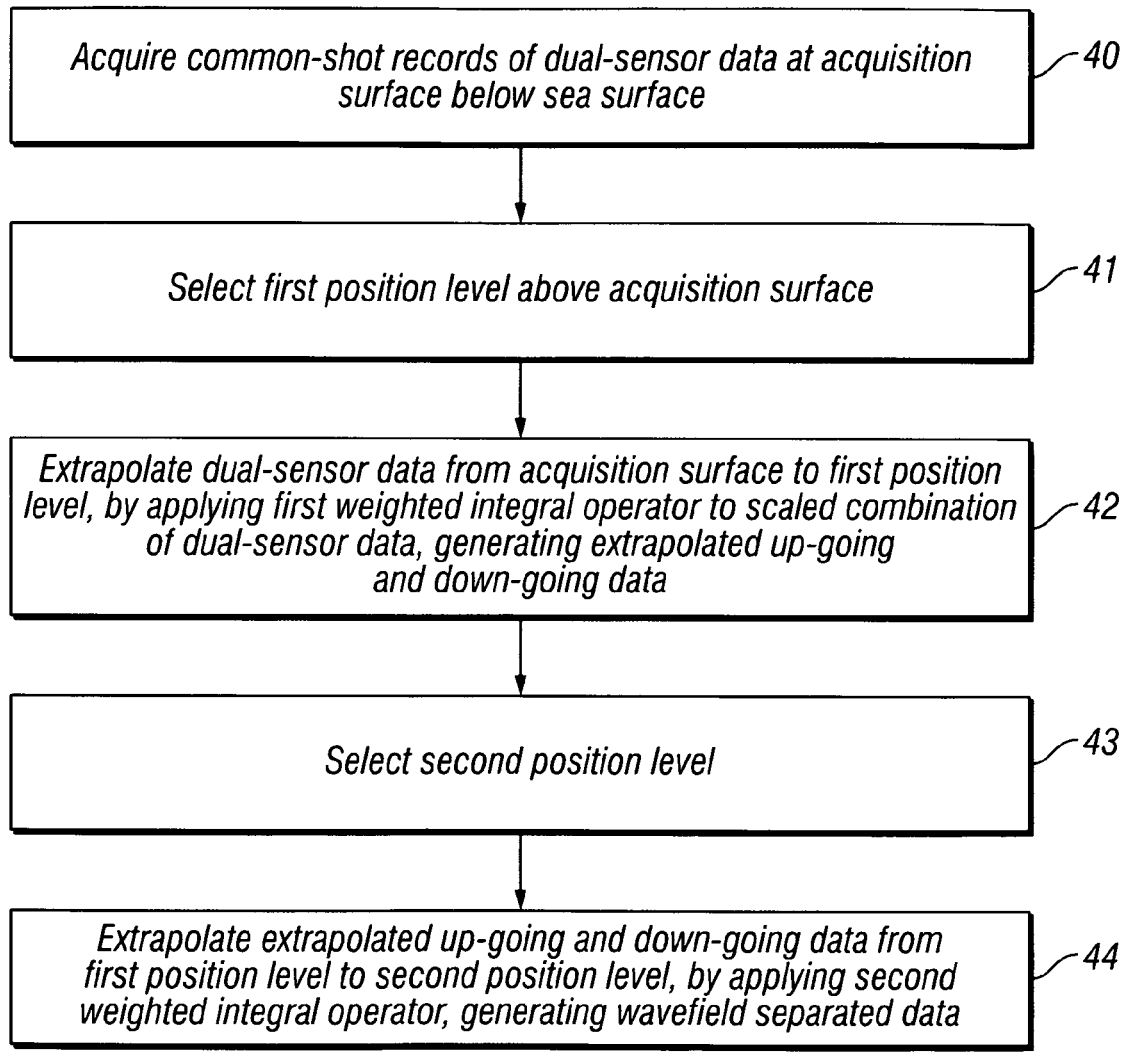
FIG. 4 is a flowchart illustrating a first embodiment of the invention for wavefield separation for dual-sensor data.
Figure 5:
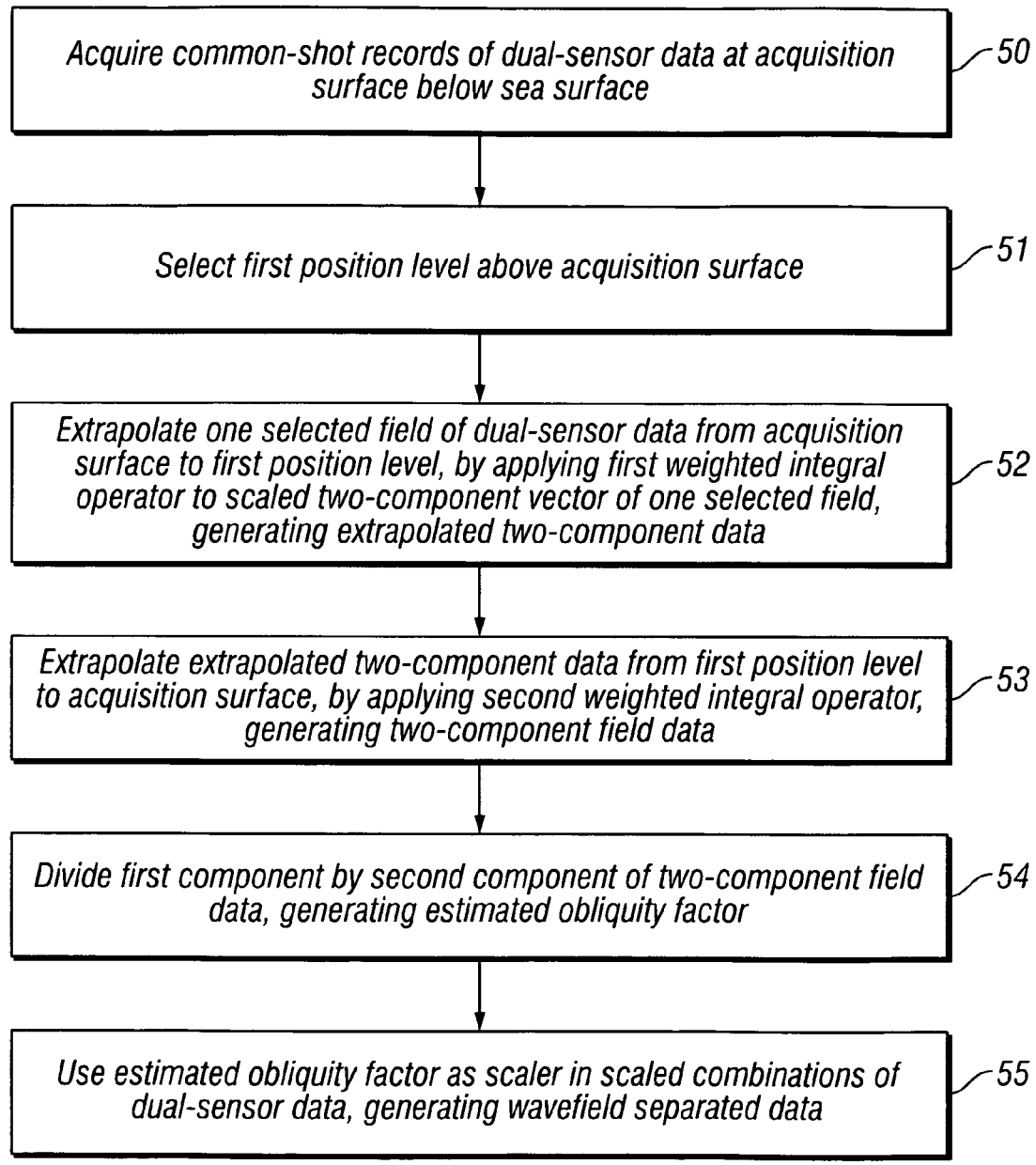
FIG. 5 is a flowchart illustrating a second embodiment of the invention for wavefield separation for dual-sensor data.
Figure 6:
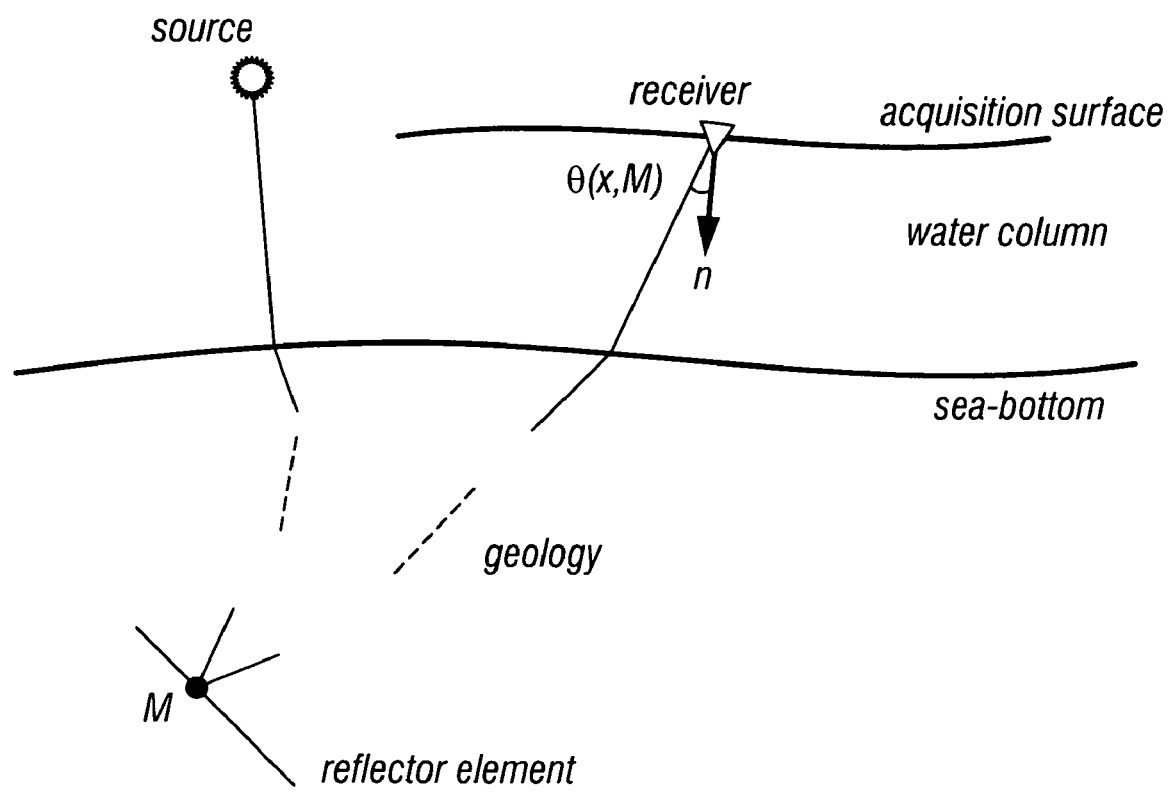
FIG. 6 is a schematic side view of a single ray corresponding to a time sample from a trace to be migrated.

FIGS. 3-5 and 7 show flowcharts illustrating embodiments of the invention for wavefield separation for dual-sensor data. FIG. 3 is a flowchart illustrating a general embodiment of the invention. FIGS. 4-5 and 7 are flowcharts further illustrating more particular embodiments of the invention as described in FIG. 3. FIGS. 1-2 and 6 are views and sections that illustrate aspects of the invention as described in the flowcharts in FIGS. 3-5 and 7.

FIG. 3 is a flowchart illustrating an embodiment of the invention for wavefield separation for dual-sensor data. At block 30, a first weighted integral operator is applied to dual-sensor data to extrapolate the dual-sensor data to a first position above the acquisition surface, generating extrapolated data. The first weighted integral operator can be applied in the time-space domain or the frequency-space domain.

At block 31, a second weighted integral operator, is applied to the extrapolated data from block 30 to extrapolate the extrapolated data to a second position, generating wavefield separated data, wherein one of the integral operators is applied to a scaled combination of the dual sensor data. The second weighted integral operator can be applied in the time-space domain or the frequency-space domain.

FIG. 4 is a flowchart illustrating a first embodiment of the invention for wavefield separation for dual-sensor data.

At block 40, common-shot records of dual-sensor data are acquired at an acquisition surface below a sea surface.

At block 41, a first position level is selected above the acquisition surface from block 40.

At block 42, the dual sensor data are extrapolated from the acquisition surface from block 40 to the first position level from block 41, by applying a first weighted integral operator to a scaled combination of the dual-sensor data from block 40, generating extrapolated up-going and down-going data. The first weighted integral operator can be applied in the time-space domain or the frequency-space domain.

At block 43, a second position level is selected. The second position level can be the original acquisition surface from block 40, the sea surface from block 40, or any other position level that is useful to select.

At block 44, the extrapolated up-going and down-going data from block 42 are extrapolated from the first position level from block 41 to the second position level from block 43, by applying a second weighted integral operator, generating wavefield separated data. The second weighted integral operator can be applied in the time-space domain or the frequency-space domain.

The second embodiment of the method of the invention is wavefield separation using vector-weighted Kirchhoff-type datuming. The second embodiment uses only one recorded wavefield in the first datuming step, either the hydrophone record or the geophone record. In this datuming step, the recorded wavefield is appropriately scaled. The same recorded wavefield is datumed without the scaling. Then, both records are back-propagated to the original acquisition surface. The ratio between the scaled record and the unscaled record yields an estimate of the obliquity factor needed for wavefield separation. One of the hydrophone or geophone records is scaled by the obliquity factor estimate and then added to or subtracted from (as appropriate) the other record to yield up-going or down-going fields, respectively. The obliquity factor estimate is an amplitude weighted average of obliquity factors associated with several crossing events at a particular time sample and is given as a function of space and time. The output of this second embodiment is, again, wavefield separated common-shot ensembles of seismic traces.

In this second embodiment, only one of the recorded wavefields is used in the first datuming step corresponding to Equations (9)-(12) or (15)-(18). In the following discussion, the method is described in terms of the pressure field for illustrative purposes only. The invention is not restricted by this choice of field. The first datuming step is performed with a two-component vector of additional weight functions and creates a two-component vector of output pressure fields. The vector of weight functions is given by:

$$w_1(x) = (\cos[\theta(x, x^R)], 1)^T. \quad (27)$$

Using the vector of weight functions from Equation (27), the output vector of pressure fields is given by:

$$p_1(x^R, t) \cong \frac{1}{2\pi} \int_S W(x, x^R) w_1(x) \frac{\partial}{\partial t} p(x, t - \tau(x, x^R)) dS, \quad (28)$$

where $p_1(x^R,t)$ designates the two-component vector:

$$p_1(x^R,t) = (p_1^w(x^R,t), p_1(x^R,t))^T. \quad (29)$$

Each of the two components of this vector of pressure fields $p_1(x^R,t)$ in Equation (29) is datumed back to the original acquisition surface, yielding a component of a second vector of pressure fields. These two second datuming equations are given by:

$$p_2^w(x, t) \cong -\frac{1}{2\pi} \int_S W(x, x^R) \frac{\partial}{\partial t} p_1^w(x^R, t + \tau(x, x^R)) dS \quad (30)$$

and $$p_2(x, t) \cong -\frac{1}{2\pi} \int_S W(x, x^R) \frac{\partial}{\partial t} p_1(x^R, t + \tau(x, x^R)) dS. \quad (31)$$

The ratio of the two pressure fields determined in Equations (30) and (31) yields the obliquity factor as a function of space and time:

$$\cos[\hat{\theta}(x, t)] = \frac{p_2^w(x, t)}{p_2(x, t)}. \quad (32)$$

For stability reasons and to avoid division by zero when $p_2(x,t)=0$ in the denominator in Equation (32), it is advantageous to build the envelope of the two pressure fields prior to the division. Thus, in another embodiment of the invention, the obliquity factor is given by:

$$\cos[\hat{\theta}(x, t)] = \frac{env[p_2^w(x, t)]}{env[p_2(x, t)]}. \quad (33)$$

The term $\cos[\hat{\theta}(x,t)]$ is used instead of $\cos[\theta(x,t)]$ for the obliquity factor in Equations (32) and (33) to reflect that an amplitude weighted average of individual obliquity factors is considered in the case of conflicting dips. This procedure provides the obliquity factor that will be used in this second embodiment of the method of the invention.

The case of three crossing events at a particular time sample and particular position will illustrate this process of taking a weighted average of obliquity factors in more detail. The two pressure fields from Equations (30) and (31), obtained after the two datuming steps, are then given by $$p_2^w(x_0, t_0) = a \cos[\theta_a(x_0, t_0)] + b \cos[\theta_b(x_0, t_0)] + c \cos[\theta_c(x_0, t_0)] \quad (34)$$

and $$p_2(x_0, t_0) = a + b + c, \quad (35)$$

where a, b, and c are the amplitudes of the three crossing events.

Consequently, $$\cos[\hat{\theta}(x_0, t_0)] = \frac{a \cos[\theta_a(x_0, t_0)] + b \cos[\theta_b(x_0, t_0)] + c \cos[\theta_c(x_0, t_0)]}{a + b + c}, \quad (36)$$

which is a weighted average of all three obliquity factors with the amplitudes of the individual events as weights.

Using the obliquity factor from either Equation (32) or (33), the separated wavefields are then calculated using the following equations:

$$p^{up}(x, t) = \frac{1}{2}\left(p(x, t) - \frac{\rho(x)c(x)}{\cos[\hat{\theta}(x, t)]} v_n(x, t)\right), \quad (37)$$

$$p^{dn}(x, t) = \frac{1}{2}\left(p(x, t) + \frac{\rho(x)c(x)}{\cos[\hat{\theta}(x, t)]} v_n(x, t)\right), \quad (38)$$

$$v_n^{up}(x, t) = \frac{1}{2}\left(v_n(x, t) - \frac{\cos[\hat{\theta}(x, t)]}{\rho(x)c(x)} p(x, t)\right), \quad (39)$$

and $$v_n^{dn}(x, t) = \frac{1}{2}\left(v_n(x, t) + \frac{\cos[\hat{\theta}(x, t)]}{\rho(x)c(x)} p(x, t)\right). \quad (40)$$

FIG. 5 is a flowchart illustrating the second embodiment of the invention for wavefield separation for dual-sensor data.

At block 50, common-shot records of dual-sensor data are acquired at an acquisition surface below a sea surface.

At block 51 a first position level above the acquisition surface from block 50 is selected.

At block 52 one selected field of the dual sensor data from block 50 is extrapolated from the acquisition surface from block 50 to the first position level from block 52, by applying a first weighted integral operator to a scaled two-component vector of the one selected field, generating extrapolated two-component data. The first weighted integral operator can be applied in the time-space domain or the frequency-space domain.

At block 53, the extrapolated two-component data from block 52 are extrapolated from the first position level from block 51 to the acquisition surface from block 50, by applying a second weighted integral operator, generating two-component field data. The second weighted integral operator can be applied in the time-space domain or the frequency-space domain. However, if the results are in the frequency-space domain, then the results must be transformed to the time-space domain before the division in block 54.

At block 54, a first component is divided by a second component of the two-component field data from block 53, generating an estimated obliquity factor.

At block 55, the estimated obliquity factor from block 54 is used as a scaler in scaled combinations of the dual-sensor data, generating wavefield separated data.

The third embodiment of the method of the invention is essentially a Kirchhoff-type depth migration with inherent wavefield separation. This third embodiment is similar to the first embodiment in that the same combination of common-shot records of the recorded wavefields is used. The recorded wavefields are not, however, extrapolated to a level above the acquisition surface, but migrated into the depth domain instead. The output of this third embodiment is depth migrated volumes and/or common-image gathers (CIG).

The basic principle behind Kirchhoff-type depth migration is to sum all the samples from traces within a given aperture around the lateral output position into the same output sample for which the recording time equals the traveltimes along rays connecting the source positions of these traces with their receiver positions through the output location under consideration. The region where the traveltime operator is tangent to the seismic event in the pre-stack data contributes the major part to the output amplitude. The principle of stationary phase thus automatically selects the correct obliquity factor. The traveltime operator is usually called diffraction traveltime function as it describes the traveltimes of a seismic event related to a diffraction point in depth. Therefore, this migration is sometimes also called diffraction stack migration. The traveltime operator will be denoted by $\tau_D$ in the following.

Kirchhoff depth migration is expressed as a weighted summation along the diffraction traveltime operator:

$$I(M) = -\frac{1}{2\pi} \int_A W(x^S, x^G, M) \frac{\partial p(x^S, x^G, t)}{\partial t}\bigg|_{t=\tau_D(x^S, x^G, M)} dA, \quad (41)$$

where M denotes the output depth location (the image location) under consideration, I is the output amplitude (the image), A is the migration aperture, and W ($x^S, x^G$, M) is a weighting factor accounting for geometrical spreading and phase changes due to caustics. The input pre-stack pressure data is given by $p(x^S, x^G, t)$. An analogous expression for the normal component of the particle velocity field $\upsilon_n(x^S, x^G, t)$ is obtained by replacing $p(x^S, x^G, t)$ by $\upsilon_n(x^S, x^G, t)$ in Equation (41). The integral above is formulated using shot ($x^S$) and receiver ($x^G$) coordinates, for illustrative purposes only. The choice of coordinates is not intended to be a limitation of the invention. There exist alternative formulations in different coordinate systems and everything following from now on applies equally well to these alternative formulations.

Analogous to the datuming in the previous section, the Kirchhoff migration in the above stated form is based on a high-frequency approximation. Thus, the input data can be treated as being composed of seismic events related to locally plane waves. Keeping the source position fixed and taking the first derivative with respect to the receiver position of the diffraction traveltime function provides the time dip of the traveltime operator. Using the local velocity at the receiver position, this time dip can be used to calculate the equivalent to $\cos\lfloor\theta(x,x^R)\rfloor$ appearing in the time domain datuming approach, i.e. the cosine of the emergence angle of the ray connecting the image location M with the receiver location $x^G$. This is denoted by $\cos\lfloor\theta(x^G,M)\rfloor$ in the following. This angle is more directly obtained from ray-tracing, a common method to calculate the diffraction traveltime operator. Using the following abbreviations $$p_1^G(x^S, x^G, M) = \frac{\partial \tau_D(x^S, x^G, M)}{\partial x_1^G} \quad (42)$$

and $$p_2^G(x^S, x^G, M) = \frac{\partial \tau_D(x^S, x^G, M)}{\partial x_2^G}, \quad (43)$$

$\cos\lfloor\theta(x^G, M)\rfloor$ is obtained by $$\cos[\theta(x^G, M)] = c(x^G)\sqrt{\frac{1}{c^2(x^G)} - (p_1^G)^2 - (p_2^G)^2} \quad (44)$$

The geometrical situation just described is depicted in FIG. 6, which is a schematic side view of a single selected ray corresponding to a time sample from a selected trace which is to be migrated. Analogous to the time domain datuming procedure it is possible to perform the wavefield separation during Kirchhoff depth migration. This migration is accomplished by the following integral equations $$I_p^{up}(M) = -\frac{1}{2\pi} \int_A W(x^S, x^G, M) \frac{1}{2} \frac{\partial}{\partial t}\bigg(p(x^S, x^G, t) - \frac{\rho(x^G)c(x^G)}{\cos[\theta(x^G, M)]} v_n(x^S, x^G, t)\bigg)\bigg|_{t=\tau_D(x^S, x^G, M)} dA, \quad (45)$$

$$I_p^{dn}(M) = -\frac{1}{2\pi} \int_A W(x^S, x^G, M) \frac{1}{2} \frac{\partial}{\partial t}\bigg(p(x^S, x^G, t) + \frac{\rho(x^G)c(x^G)}{\cos[\theta(x^G, M)]} v_n(x^S, x^G, t)\bigg)\bigg|_{t=\tau_D(x^S, x^G, M)} dA, \quad (46)$$

$$I_v^{up}(M) = -\frac{1}{2\pi} \int_A W(x^S, x^G, M) \frac{1}{2} \frac{\partial}{\partial t}\bigg(v_n(x^S, x^G, t) - \frac{\cos[\theta(x^G, M)]}{\rho(x^G)c(x^G)} p(x^S, x^G, t)\bigg)\bigg|_{t=\tau_D(x^S, x^G, M)} dA, \quad (47)$$

and $$I_v^{dn}(M) = -\frac{1}{2\pi} \int_A W(x^S, x^G, M) \frac{1}{2} \frac{\partial}{\partial t}\bigg(v_n(x^S, x^G, t) + \frac{\cos[\theta(x^G, M)]}{\rho(x^G)c(x^G)} p(x^S, x^G, t)\bigg)\bigg|_{t=\tau_D(x^S, x^G, M)} dA. \quad (48)$$

The principle of stationary phase automatically selects the correct scaling of the particle velocity field or the pressure field in Equations (45)-(48), as only contributions from a small zone around the stationary point constructively contribute to the integration.

FIG. 7 is a flowchart illustrating an embodiment of the invention for wavefield separation for dual-sensor data.

At block 70, common-shot records of dual-sensor data are acquired at an acquisition surface.

At block 71, the dual-sensor data from block 70 are migrated from the acquisition surface from block 70 into a depth domain, by applying a weighted integral operator to a scaled combination of the dual-sensor data from block 70 in the time-space domain, generating wavefield separated data.

For a practical implementation, all integrations in the embodiments described above have to be replaced by discrete summations. Area elements, which appear inside the integral expressions, are given by a multiplication of the receiver spacings in both lateral directions for a regular grid of receivers. In any case, including irregular geometries, these surface elements can be calculated by means well-known to people skilled in the art. The same applies to the weights appearing in the integral expressions. They are also well-known in the art. The implementations can be based on standard implementations of Kirchhoff-type datuming and migration schemes.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:
1. A method for wavefield separation for dual-sensor data, comprising:
    using a programmable computer to perform the following:
        applying a first weighted integral operator to dual-sensor data to extrapolate the dual-sensor data to a first position above an acquisition surface, generating extrapolated data; and applying a second weighted integral operator to the extrapolated data to extrapolate the extrapolated data to a second position, generating wavefield separated data, wherein one of the integral operators is applied to a scaled combination of the dual sensor data.

2. The method of claim 1, wherein the applying a first weighted integral operator comprises:

acquiring common-shot records of dual-sensor data at an acquisition surface below a sea surface;

using a programmable computer to perform the following:

selecting a first position level above the acquisition surface; and extrapolating the dual sensor data in the time-domain from the acquisition surface to the first position level, by applying a first weighted integral operator to a scaled combination of the dual-sensor data, generating extrapolated up-going and down-going data.

3. The method of claim 2, wherein the extrapolating the dual-sensor data is accomplished by applying the following equations in the frequency-space domain:

$$p^{up}(x^R, \omega) \cong \frac{i\omega}{2\pi} \int_S W(x, x^R)$$
$$\frac{1}{2}\left(p(x, \omega) - \frac{\rho(x)c(x)}{\cos[\theta(x, x^R)]} v_n(x, \omega)\right) \exp[-i\omega\tau(x, x^R)] dS,$$

$$p^{dn}(x^R, \omega) \cong \frac{i\omega}{2\pi} \int_S W(x, x^R) \frac{1}{2}\left(p(x, \omega) + \frac{\rho(x)c(x)}{\cos[\theta(x, x^R)]} v_n(x, \omega)\right)$$
$$\exp[-i\omega\tau(x, x^R)] dS,$$

$$v_n^{up}(x^R, \omega) \cong \frac{i\omega}{2\pi} \int_S W(x, x^R) \frac{1}{2}\left(v_n(x, \omega) - \frac{\cos[\theta(x, x^R)]}{\rho(x)c(x)} p(x, \omega)\right)$$
$$\exp(-i\omega\tau(x, x^R)) dS,$$

and $$v_n^{dn}(x^R, \omega) \cong$$
$$\frac{i\omega}{2\pi} \int_S W(x, x^R) \frac{1}{2}\left(v_n(x, \omega) + \frac{\cos[\theta(x, x^R)]}{\rho(x)c(x)} p(x, \omega)\right) \exp(-i\omega\tau(x, x^R)) dS,$$

where $p^{up}(x^R,\omega)$ is an up-going component of pressure extrapolated to $x^R$, $p^{dn}(x^R,\omega)$ is a down-going component of pressure extrapolated to $x^R$, $v_n^{up}(x^R,\omega)$ is an up-going component of normal component of particle velocity extrapolated to $x^R$, $v_n^{dn}(x^R,\omega)$ is a down-going component of normal component of particle velocity extrapolated to $x^R$, x is a point on an acquisition surface S, $x^R$ is a point above the acquisition surface S, $\omega$ is angular frequency, $W(x,x^R)$ is a weighting factor, $p(x,\omega)$ is pressure measured at x, $v_n(x,\omega)$ is a normal component of particle velocity measured at x, $\rho(x)$ is density, $c(x)$ is speed of sound, $\theta(x,x^R)$ is an angle between a ray connecting x and $x^R$ and a unit normal vector to the acquisition surface S, and $\tau(x,x^R)$ is traveltime along the ray connecting x and $x^R$.

4. The method of claim 2, wherein the extrapolating the dual-sensor data is accomplished by applying the following equations in the time-space domain:

$$p^{up}(x^R, t) \cong \frac{1}{2\pi} \int_S W(x, x^R)$$
$$\frac{1}{2}\frac{\partial}{\partial t}\left(p(x, t - \tau(x, x^R)) - \frac{\rho(x)c(x)}{\cos[\theta(x, x^R)]} v_n(x, t - \tau(x, x^R))\right) dS,$$

$$p^{dn}(x^R, t) \cong \frac{1}{2\pi} \int_S W(x, x^R)$$
$$\frac{1}{2}\frac{\partial}{\partial t}\left(p(x, t - \tau(x, x^R)) + \frac{\rho(x)c(x)}{\cos[\theta(x, x^R)]} v_n(x, t - \tau(x, x^R))\right) dS,$$

$$v_n^{up}(x^R, t) \cong \frac{1}{2\pi} \int_S W(x, x^R)$$
$$\frac{1}{2}\frac{\partial}{\partial t}\left(v_n(x, t - \tau(x, x^R)) - \frac{\cos[\theta(x, x^R)]}{\rho(x)c(x)} p(x, t - \tau(x, x^R))\right) dS,$$

and $$v_n^{dn}(x^R, t) \cong \frac{1}{2\pi} \int_S W(x, x^R)$$
$$\frac{1}{2}\frac{\partial}{\partial t}\left(v_n(x, t - \tau(x, x^R)) + \frac{\cos[\theta(x, x^R)]}{\rho(x)c(x)} p(x, t - \tau(x, x^R))\right) dS,$$

where $p^{up}(x^R,t)$ is an up-going component of pressure extrapolated to $x^R$, $p^{dn}(x^R,t)$ is a down-going component of pressure extrapolated to $x^R$, $v_n^{up}(x^R,t)$ is an up-going component of normal component of particle velocity extrapolated to $x^R$, $v_n^{dn}(x^R,t)$ is a down-going component of normal component of particle velocity extrapolated to $x^R$, x is a point on an acquisition surface S, $x^R$ is a point above the acquisition surface S, t is time, $W(x,x^R)$ is a weighting factor, $p(x,t)$ is pressure measured at x, $v_n(x,t)$ is a normal component of particle velocity measured at x, $\rho(x)$ is density, $c(x)$ is speed of sound, $\theta(x, x^R)$ is an angle between a ray connecting x and $x^R$ and a unit normal vector to the acquisition surface S, and $\tau(x,x^R)$ is traveltime along the ray connecting x and $x^R$.

5. The method of claim 2, wherein the applying a second weighted integral operator comprises:

using a programmable computer to perform the following:

selecting a second position level; and extrapolating the extrapolated up-going and down-going data from the first position level to the second position level, by applying a second weighted integral operator generating wavefield separated data.

6. The method of claim 5, wherein the extrapolating the extrapolated up-going and down-going data is accomplished by applying the following equations in the frequency-space domain:

$$p^{up}(\tilde{x}, \omega) \cong -\frac{i\omega}{2\pi} \int_S W(x^R, \tilde{x}) p^{up}(x^R, \omega) \exp(i\omega\tau(\tilde{x}, x^R)) dS,$$

$$p^{dn}(\tilde{x}, \omega) \cong -\frac{i\omega}{2\pi} \int_S W(x^R, \tilde{x}) p^{dn}(x^R, \omega) \exp(i\omega\tau(\tilde{x}, x^R)) dS,$$

$$v_n^{up}(\tilde{x}, \omega) \cong -\frac{i\omega}{2\pi} \int_S W(x^R, \tilde{x}) v_n^{up}(x^R, \omega) \exp(i\omega\tau(\tilde{x}, x^R)) dS,$$

and $$v_n^{dn}(\tilde{x}, \omega) \cong -\frac{i\omega}{2\pi} \int_S W(x^R, \tilde{x}) v_n^{dn}(x^R, \omega) \exp(i\omega\tau(\tilde{x}, x^R)) dS,$$

where $p^{up}(\tilde{x},\omega)$ is an up-going component of pressure extrapolated to $\tilde{x}$, $p^{dn}(\tilde{x},\omega)$ is a down-going component of pressure extrapolated $\tilde{x}$, $v_n^{up}(\tilde{x},\omega)$ is an up-going component of normal component of particle velocity extrapolated to $\tilde{x}$, $v_n^{dn}(\tilde{x},\omega)$ is a down-going component of normal component of particle velocity extrapolated to $\tilde{x}$, $x^R$ is a point above an acquisition surface S, $\tilde{x}$ is a point below $x^R$, $\omega$ is angular frequency, $W(x^R,\tilde{x})$ is a weighting factor, $p^{up}(x^R,\omega)$ is an up-going component of pressure extrapolated to $x^R$, $p^{dn}(x^R,\omega)$ is a down-going component of pressure extrapolated to $x^R$, $v_n^{up}(x^R,\omega)$ is an up-going component of normal component of particle velocity extrapolated to $x^R$, $v_n^{dn}(x^R,\omega)$ is a down-going component of normal component of particle velocity extrapolated to $x^R$, and $\tau(\tilde{x},x^R)$ is traveltime along the ray connecting $\tilde{x}$ and $x^R$.

7. The method of claim 5, wherein the extrapolating the extrapolated up-going and down-going data is accomplished by applying the following equations in the time-space domain:

$$p^{up}(\tilde{x},t) \cong -\frac{1}{2\pi}\int_S W(x^R,\tilde{x})\frac{\partial}{\partial t}p^{up}(x^R,t+\tau(\tilde{x},x^R))\,dS,$$

$$p^{dn}(\tilde{x},t) \cong -\frac{1}{2\pi}\int_S W(x^R,\tilde{x})\frac{\partial}{\partial t}p^{dn}(x^R,t+\tau(\tilde{x},x^R))\,dS,$$

$$v_n^{up}(\tilde{x},t) \cong -\frac{1}{2\pi}\int_S W(x^R,\tilde{x})\frac{\partial}{\partial t}v_n^{up}(x^R,t+\tau(\tilde{x},x^R))\,dS,$$

and $$v_n^{dn}(\tilde{x},t) \cong -\frac{1}{2\pi}\int_S W(x^R,\tilde{x})\frac{\partial}{\partial t}v_n^{dn}(x^R,t+\tau(\tilde{x},x^R))\,dS,$$

where $p^{up}(\tilde{x},t)$ is an up-going component of pressure extrapolated to $\tilde{x}$, $p^{dn}(\tilde{x},t)$ is a down-going component of pressure extrapolated to $\tilde{x}$, $v_n^{up}(\tilde{x},t)$ is an up-going component of normal component of particle velocity extrapolated to $\tilde{x}$, $v_n^{dn}(\tilde{x},t)$ is a down-going component of normal component of particle velocity extrapolated to $\tilde{x}$, $x^R$ is a point above an acquisition surface S, $\tilde{x}$ is a point below $x^R$, t is time, $W(x^R,\tilde{x})$ is a weighting factor, $p^{up}(x^R,t)$ is an up-going component of pressure extrapolated to $x^R$, $p^{dn}(x^R,t)$ is a down-going component of pressure extrapolated to $x^R$, $v_n^{up}(x^R,t)$ is an up-going component of normal component of particle velocity extrapolated to x $x^R$, $v_n^{dn}(x^R,t)$ is a down-going component of normal component of particle velocity extrapolated to $x^R$, and $\tau(\tilde{x},x^R)$ is traveltime along the ray connecting $\tilde{x}$ and $x^R$.

8. The method of claim 1, wherein the applying a first weighted integral operator comprises:
acquiring common-shot records of dual-sensor streamer data at an acquisition surface below a sea surface;
using a programmable computer to perform the following:
selecting a first position level above the acquisition surface; and
extrapolating one selected field of the dual sensor data in the time-domain from the acquisition surface to the first position level, by applying a first weighted integral operator to a scaled two-component vector of the one selected field, generating extrapolated two-component data.

9. The method of claim 8, wherein the extrapolating one selected field of the dual sensor data is accomplished by applying the following equations in the time-space domain:

$$p_1(x^R,t) \cong \frac{1}{2\pi}\int_S W(x,x^R)w_1(x)\frac{\partial}{\partial t}p(x,t-\tau(x,x^R))\,dS,$$

where $p_1(x^R,t)$ designates a two-component pressure vector:

$$p_l(x^R,t) = (p_l^w(x^R,t), p_l(x^R,t))^T,$$

$W(x,x^R)$ is a weighting factor, $w_1(x)$ is a vector of weight functions given by:

$$w_l(x) = (\cos[\theta(x,x^R)], 1)^T,$$

x is a point on an acquisition surface S, $x^R$ is a point above the acquisition surface S, p(x,t) is pressure measured at x on the acquisition surface S, $p_1^w(x^r,t)$ is a first weighted pressure component at the point $x^R$, $p_1(x^R,t)$ is a first unweighted pressure component at the point $x^R$, $\theta(x,x^{rR})$ is an angle between a ray connecting x and $x^R$ and a unit normal vector to the acquisition surface S, and $\tau(x,x^R)$ is traveltime along a ray connecting x and $x^R$.

10. The method of claim 8, wherein the applying a second weighted integral operator comprises:
using a programmable computer to perform the following:
extrapolating the extrapolated two-component data from the first position level to the acquisition surface, by applying a second weighted integral operator, generating two-component field data;
dividing a first component by a second component of the two-component field data, generating an estimated obliquity factor; and
using the estimated obliquity factor as a scaler in scaled combinations of the dual-sensor data, generating wavefield separated data.

11. The method of claim 10, wherein the extrapolating the extrapolated two-component data is accomplished by applying the following equations in the time-space domain:

$$p_2^w(x,t) \cong -\frac{1}{2\pi}\int_S W(x,x^R)\frac{\partial}{\partial t}p_1^w(x^R,t+\tau(x,x^R))\,dS$$

and $$p_2(x,t) \cong -\frac{1}{2\pi}\int_S W(x,x^R)\frac{\partial}{\partial t}p_1(x^R,t+\tau(x,x^R))\,dS.$$

where $p_2^w(x,t)$ is a second weighted pressure component at the point x, $p_2(x,t)$ is a second unweighted pressure component at the point x, $W(x,x^R)$ is a weighting factor, x is a point on an acquisition surface S, $x^R$ is a point above the acquisition surface S, $p_1^w(x^R,t)$ is a first weighted pressure component at the point $x^R$, $p_1(x^R,t)$ is a first unweighted pressure component at the point $x^R$, and $\tau(x,x^R)$ is traveltime along a ray connecting x and $x^R$.

12. The method of claim 11, wherein the dividing a first component by a second component is accomplished by applying the following equation in the time-space domain:

$$\cos[\hat{\theta}(x,t)] = \frac{p_2^w(x,t)}{p_2(x,t)}.$$

where $\cos[\hat{\theta}(x,t)]$ is an estimated obliquity factor.

13. The method of claim 11, wherein the dividing a first component by a second component is accomplished by applying the following equation in the time-space domain:

$$\cos[\hat{\theta}(x,t)] = \frac{env[p_2^w(x,t)]}{env[p_2(x,t)]}.$$

where $\cos[\hat{\theta}(x,t)]$ is an estimated obliquity factor.

14. The method of claim 10, wherein the using the estimated obliquity factor as a scaler is accomplished by applying the following equations in the time-space domain:

$$p^{up}(x,t) = \frac{1}{2}\left(p(x,t) - \frac{\rho(x)c(x)}{\cos[\hat{\theta}(x,t)]}v_n(x,t)\right),$$

-continued $$p^{dn}(x,t) = \frac{1}{2}\left(p(x,t) + \frac{\rho(x)c(x)}{\cos[\hat{\theta}(x,t)]}v_n(x,t)\right),$$

$$v_n^{up}(x,t) = \frac{1}{2}\left(v_n(x,t) - \frac{\cos[\hat{\theta}(x,t)]}{\rho(x)c(x)}p(x,t)\right),$$

and $$v_n^{dn}(x,t) = \frac{1}{2}\left(v_n(x,t) + \frac{\cos[\hat{\theta}(x,t)]}{\rho(x)c(x)}p(x,t)\right).$$

where $p^{up}(x,t)$ is an up-going component of pressure extrapolated to x, $p^{dn}(x,t)$ is a down-going component of pressure extrapolated to x, $v_n^{up}(x,t)$ is an up-going component of normal component of particle velocity extrapolated to x, $v_n^{dn}(x,t)$ is a down-going component of normal component of particle velocity extrapolated to x, $x^R$ is a point above an acquisition surface S, $p(x,t)$ is pressure measured at x, $v_n(x,t)$ is a normal component of particle velocity measured at x, $\rho(x)$ is density, $c(x)$ is speed of sound, and $\cos[\hat{\theta}(x,t)]$ is an estimated obliquity factor.

15. The method of claim 1, wherein the applying a first weighted integral operator comprises:

acquiring common-shot records of dual-sensor data at an acquisition surface.

16. The method of claim 15, wherein the applying a second weighted integral operator comprises:

using a programmable computer to perform the following:

migrating the dual-sensor data from the acquisition surface into a depth domain, by applying in the time-space domain a weighted integral operator to a scaled combination of the dual-sensor data, generating wavefield separated data.

17. The method of claim 16, wherein the migrating the dual-sensor data is accomplished by applying the following equations:

$$I_p^{up}(M) = -\frac{1}{2\pi}\int_A W(x^S, x^G, M)\frac{1}{2}\frac{\partial}{\partial t}\left(p(x^S, x^G, t) - \frac{\rho(x^G)c(x^G)}{\cos[\theta(x^G, M)]}v_n(x^S, x^G, t)\right)\bigg|_{t=\tau_D(x^S, x^G, M)} dA,$$

$$I_p^{dn}(M) = -\frac{1}{2\pi}\int_A W(x^S, x^G, M)\frac{1}{2}\frac{\partial}{\partial t}\left(p(x^S, x^G, t) + \frac{\rho(x^G)c(x^G)}{\cos[\theta(x^G, M)]}v_n(x^S, x^G, t)\right)\bigg|_{t=\tau_D(x^S, x^G, M)} dA,$$

$$I_v^{up}(M) = -\frac{1}{2\pi}\int_A W(x^S, x^G, M)\frac{1}{2}\frac{\partial}{\partial t}\left(v_n(x^S, x^G, t) - \frac{\cos[\theta(x^G, M)]}{\rho(x^G)c(x^G)}p(x^S, x^G, t)\right)\bigg|_{t=\tau_D(x^S, x^G, M)} dA,$$

and $$I_v^{dn}(M) = -\frac{1}{2\pi}\int_A W(x^S, x^G, M)\frac{1}{2}\frac{\partial}{\partial t}\left(v_n(x^S, x^G, t) + \frac{\cos[\theta(x^G, M)]}{\rho(x^G)c(x^G)}p(x^S, x^G, t)\right)\bigg|_{t=\tau_D(x^S, x^G, M)} dA,$$

where $I_p^{up}(M)$ is an up-going amplitude of pressure at image location M, $I_p^{dn}(M)$ is a downgoing amplitude of pressure at image location M, $I_v^{up}(M)$ is an up-going amplitude of normal particle velocity at image location M, $I_v^{dn}(M)$ is a downgoing amplitude of normal particle velocity at image location M, M is an image location, A is a migration aperture, $W(x^S, x^G, M)$ is a weighting factor accounting for geometrical spreading and phase changes due to caustics, $x^S$ is a source location, $x^G$ is a receiver location, t is time, $p(x^S, x^G, t)$ is pressure, $v_n(x^S, x^G, t)$ is a normal component of the particle velocity field, $\rho(x^G)$ is density, $c(x^G)$ is speed of sound, $\theta(x^G, M)$ is emergence angle of the ray connecting the image location M with the receiver location $x^G$, and $\tau_D(x^S, x^G, M)$ is diffraction traveltime operator.

* * * * *